(12) United States Patent
Kano (10) Patent No.: US 7,982,773 B2
(45) Date of Patent: Jul. 19, 2011

(54) IMAGING APPARATUS CAPABLE OF CAPTURING AN IMAGE WITH REDUCED LIGHT FALLOFF AT EDGES AND METHOD FOR CONTROLLING THE SAME

(75) Inventor: Masaaki Kano, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 517 days.

(21) Appl. No.: 12/107,673

(22) Filed: Apr. 22, 2008

(65) Prior Publication Data

US 2008/0291299 A1 Nov. 27, 2008

(30) Foreign Application Priority Data

May 21, 2007 (JP) ................................. 2007-133888

(51) Int. Cl.
*H04N 5/228* (2006.01)
(52) U.S. Cl. ................................. 348/208.4; 348/208.99
(58) Field of Classification Search ............. 348/208.99, 348/208.1, 208.4–208.9, 208.11–208.13
See application file for complete search history.

(56) References Cited

U.S. PATENT DOCUMENTS

| 7,479,985 | B2 * | 1/2009 | Noguchi et al. | 348/208.5 |
| 7,536,091 | B2 * | 5/2009 | Nomura et al. | 396/55 |
| 2004/0201707 | A1 * | 10/2004 | Noguchi et al. | 348/208.7 |
| 2004/0201771 | A1 * | 10/2004 | Itoh | 348/363 |
| 2006/0001745 | A1 * | 1/2006 | Shiomi | 348/222.1 |
| 2007/0097219 | A1 * | 5/2007 | Nomura et al. | 348/208.7 |
| 2007/0098291 | A1 * | 5/2007 | Niikura et al. | 382/254 |

FOREIGN PATENT DOCUMENTS

| JP | 2003-110936 A | 4/2003 |
| JP | 2006-165784 A | 6/2006 |

* cited by examiner

*Primary Examiner* — Kelly L Jerabek
(74) *Attorney, Agent, or Firm* — Canon USA, Inc. IP Div (57) ABSTRACT

An imaging apparatus includes a diaphragm unit configured to adjust an amount of incident light on an image sensor, a correction unit configured to perform a correction of an image signal that corresponds to driving of the diaphragm unit, and a control unit configured to control the diaphragm unit and the correction unit. The correction unit includes at least a first state for performing a correction of the image signal when it can be determined that the diaphragm unit is not being driven by the control unit and a second state for not performing a correction of the image signal or for performing a correction of the image signal weaker than that performed in the first state when it can be determined that the diaphragm unit is being driven by the control unit.

6 Claims, 10 Drawing Sheets

IMAGING APPARATUS CAPABLE OF CAPTURING AN IMAGE WITH REDUCED LIGHT FALLOFF AT EDGES AND METHOD FOR CONTROLLING THE SAME

BACKGROUND OF THE INVENTION

1. Field of the Invention

The present invention relates to an imaging apparatus and a method for controlling the imaging apparatus. More particularly, the present invention relates to an imaging apparatus capable of capturing an image with reduced light falloff at edges and a method for controlling the same.

2. Description of the Related Art

An imaging apparatus is configured to capture an image of an object via a lens. The amount of light is relatively low in the peripheral region of a captured image compared to that in the central region. This is referred to as "light falloff at edges."

Light falloff at edges is generally dependent on a relationship between the properties of a lens equipped in an imaging apparatus and properties of a solid-state image sensor.

More specifically, the amount of light falloff at edges is variable according to a positional relationship between the solid-state image sensor and an effective image circle (the diameter of the sharp image circle formed by a lens). In this case, an effective pixel center of the solid-state image sensor accords with an optical axis center of the lens.

Furthermore, the amount of light falloff at edges is variable according to an aperture value of the lens. Light falloff is maximized when the aperture is fully opened. According to general lens properties, incident light passing through the center of a lens has a circular light flux, while incident light passing through a peripheral region of the lens has an elliptic light flux. Thus, the amount of light decreases at the peripheral region of the lens.

When the diaphragm is in a full aperture state, a relatively large amount of incident light passes through a peripheral region of the lens. The shading of light greatly increases. Therefore, light falloff at edges greatly increases.

The above-described phenomenon can be eliminated if a lens equipped in an imaging apparatus has an effective image circle that is sufficiently large compared to the number of pixels provided in the solid-state image sensor. However, a lens satisfying such conditions has a large size. The imaging apparatus cannot be downsized if the size of a lens is enlarged.

Furthermore, in view of the need for a compact imaging apparatus, it is difficult to use a large lens. Additionally, the number of pixels provided for a solid-state image sensor incorporated in an imaging apparatus is rapidly increasing. Therefore, light falloff at edges greatly increases.

A technique capable of downsizing an imaging apparatus while reducing light falloff at edges is discussed in Japanese Patent Application Laid-Open No. 2003-110936.

According to an imaging apparatus discussed in Japanese Patent Application Laid-Open No. 2003-110936, an image plane is divided into a plurality of blocks and a peripheral brightness correction coefficient corresponding to an aperture value is used for each block. Therefore, an appropriate correction can be performed even when the amount of light falloff at edges is not uniform at four corners of a rectangular image plane. As a result, the imaging apparatus can generate an image having an excellent quality without causing any light falloff at edges.

Furthermore, if an imaging apparatus has an optical image-shake correcting function or an electronic image-shake correcting function, the amount of light falloff at a peripheral region of the image plane tends to fluctuate relative to an amount of light at the central region of the image plane.

This problem is significant if the center of a lens deviates from the center of a solid-state image sensor during a shifting operation of the lens performed in the optical image-shake correction.

Therefore, due to the deviation between the centers of optical axes, the amount of light falloff at edges does not become uniform in a peripheral region of the image plane and may be greatly changed according to a shift state of the lens.

For the above-described reasons, when the optical image-shake correction is performed, the occurrence level (frequency) of light falloff at edges changes according to a shift amount of the lens. A similar phenomenon occurs in the electronic image-shake correction, which performs an image shake correction by changing a pixel extraction area.

To address the above-described problems, as discussed in Japanese Patent Application Laid-Open No. 2006-165784, an imaging apparatus is capable of calculating the central position of an optical axis and changing a correction amount for correcting light falloff at edges according to the central position of the optical axis.

As described above, the imaging apparatus discussed in Japanese Patent Application Laid-Open No. 2003-110936 constantly performs a correction of light falloff at edges using a peripheral brightness correction coefficient corresponding to an aperture value for each block during an object shooting operation.

Thus, if the aperture value dynamically changes according to exposure conditions or a zoom operation during an object shooting operation, the correction value for correcting light falloff at edges dynamically changes.

However, before starting the correction after completing calculation of the correction coefficient according to an exposure state during an object shooting operation, an aperture value may change and, therefore, the amount for correction may become excessively large or small. This problem is serious in a shooting operation for a moving image, in which the continuity of displayed video images is essentially required.

According to the imaging apparatus discussed in Japanese Patent Application Laid-Open No. 2006-165784, when a user holds the imaging apparatus to capture a moving image, the image shake correction is constantly performed and, therefore, an image shake correction amount dynamically changes.

Thus, before starting the correction after completing calculation of a correction coefficient according to a calculation result of the optical axis position, the actual position of an optical axis changes if a camera shake is caused during an object shooting operation. Thus, the amount for correction may become excessively large or small.

SUMMARY OF THE INVENTION

Exemplary embodiments of the present invention are directed to an imaging apparatus that is capable of stably performing a correction of light falloff at edges according to a determination as to whether to perform the correction based on an aperture value.

According to a first aspect of the present invention, an imaging apparatus includes a diaphragm unit configured to adjust a quantity of incident light for an image sensor, a correction unit configured to perform a correction for an image signal which corresponds to an operation of the diaphragm unit, and a control unit configured to control the diaphragm unit and the correction unit. The correction unit performs the correction for the image signal in a first state where it can be regarded that the diaphragm unit is not driven under control of the control unit, while the correction unit does not perform the correction or decreases a correction amount for the image signal in a second state where it can be regarded that the diaphragm unit is driven.

According to a second aspect of the present invention, an imaging apparatus includes a diaphragm unit configured to adjust a quantity of incident light for an image sensor, an image stabilization unit configured to correct an image shake generated when the imaging apparatus vibrates, a correction unit configured to perform a correction for an image signal which corresponds to an operation of the diaphragm unit or an operation of the image stabilization unit, and a control unit configured to control the diaphragm unit, the image stabilization unit, and the correction unit. The correction unit performs the correction for the image signal in a first state where it can be regarded that the diaphragm unit and the image stabilization unit are not driven under the control of the control unit, while the correction unit does not at least one of the diaphragm unit and the image stabilization unit is driven by the control unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments and features of the invention and, together with the description, serve to explain at least some of the principles of the invention.

DETAILED DESCRIPTION OF THE EMBODIMENTS

The following description of exemplary embodiments is illustrative in nature and is in no way intended to limit the invention, its application, or uses. It is noted that throughout the specification, similar reference numerals and letters refer to similar items in the following figures, and thus once an item is described in one figure, it may not be discussed for following figures. Exemplary embodiments will be described in detail below with reference to the drawings.

First Exemplary Embodiment

Figure 1:
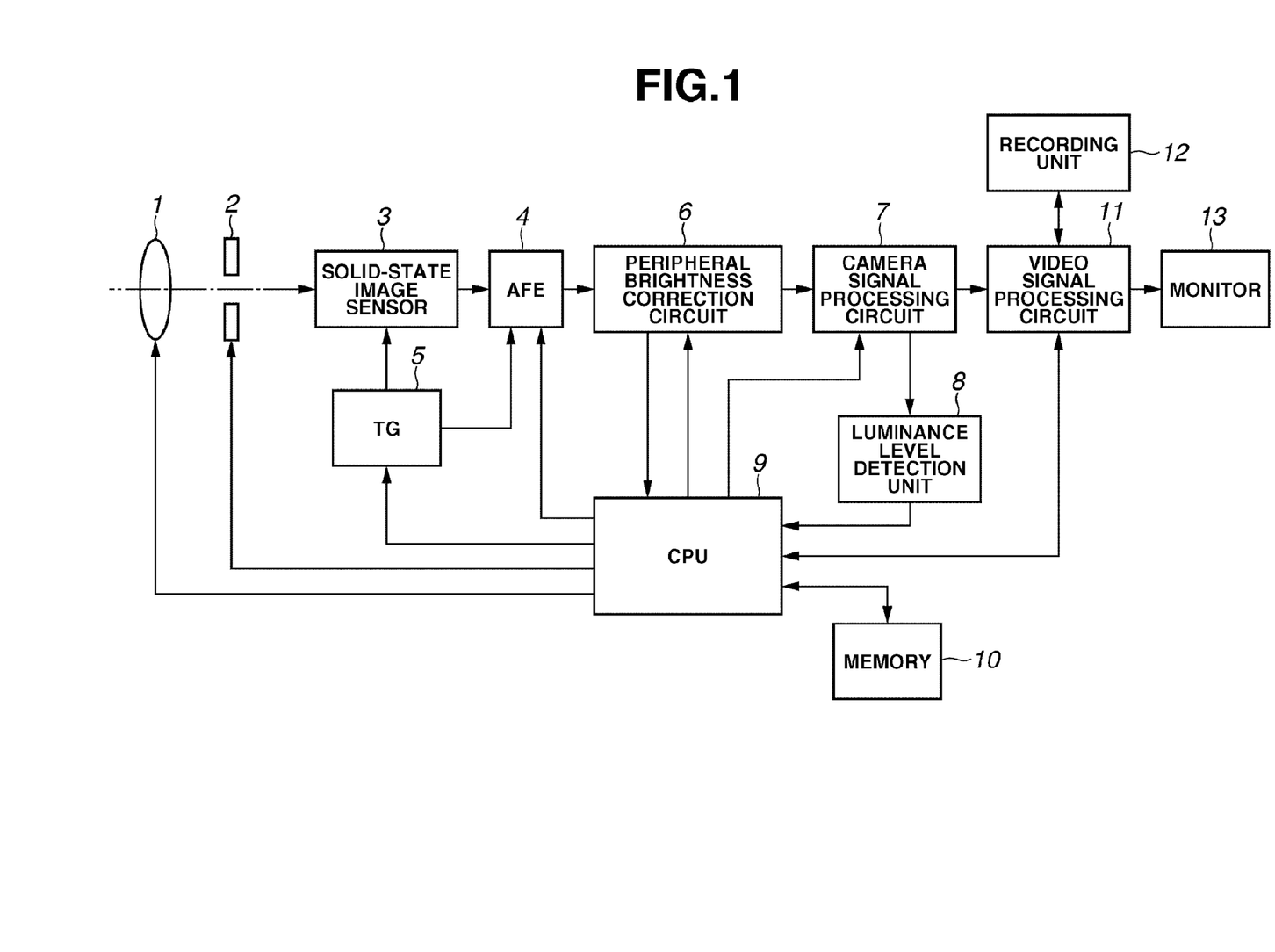
FIG. 1 is a block diagram illustrating an example configuration of an imaging apparatus according to a first exemplary embodiment of the present invention.

FIG. 1 is a block diagram illustrating an example configuration of an imaging apparatus according to a first exemplary embodiment of the present invention.

In FIG. 1, light from an object (optical signal) passes through a lens 1. A solid-state image sensor 3 is, for example, a charge-coupled device (CCD) sensor or a complementary metal-oxide semiconductor (CMOS) sensor, which has a photoelectric conversion function. A diaphragm (iris) 2 adjusts an amount of incident light on the solid-state image sensor 3.

Light (optical signal), having passed through the lens 1, reaches the solid-state image sensor 3 via the diaphragm 2. A central processing unit (CPU) 9 performs overall control for the imaging apparatus. In this respect, the CPU 9 functions as correction data acquisition unit. A timing generator (TG) 5 outputs a timing signal of a predetermined period (e.g., a transfer pulse whose amplitude is approximately 3 V) in synchronism with a horizontal synchronizing signal HD. The CPU 9 controls the TG 5.

The solid-state image sensor 3 is driven in response to a timing pulse generated by the TG 5 and performs a photoelectric conversion for outputting an electric signal converted from an optical signal.

An analog front end (AFE) 4 includes a correlated double sampler (CDS) (not shown) that performs correlated double sampling, an automatic gain controller (AGC) (not shown) that performs automatic gain control, and an analog-to-digital (A/D) converter (not shown) that converts an analog signal into a digital signal. The AFE 4 receives a signal from the solid-state image sensor 3. A peripheral brightness correction circuit 6 receives a digital signal output from the AFE 4.

The peripheral brightness correction circuit 6 divides an output signal from the AFE 4 into a total of 128 uniform blocks. The peripheral brightness correction circuit 6 performs an operation for correcting light falloff at edges and outputs RAW data. In an exemplary embodiment, the peripheral brightness correction circuit 6 functions as a correction unit.

A camera signal processing circuit 7 separates an input signal into Y (luminance) and C (color) signals and performs various processing (e.g., video signal processing, color signal processing, and gamma correction processing) to generate a processed image. The camera signal processing circuit 7 receives a signal output from the peripheral brightness correction circuit 6.

A luminance level detection unit 8 calculates a luminance level detection value based on a Y signal and outputs the calculated value to the CPU 9. The luminance level detection unit 8 receives the Y signal from the camera signal processing circuit 7, which performs the above-described Y/C separation, to perform exposure correction.

The CPU 9 calculates an exposure evaluation value based on an output signal from the luminance level detection unit 8, determines an exposure state based on the exposure evaluation value, and calculates a difference value relative to an exposure correction amount with reference to an exposure correction table, which is prepared beforehand. A memory 10 temporarily stores various data calculated by the CPU 9.

If it is determined that there is a difference value, the CPU 9 outputs control signals to a neutral density (ND) filter unit (not shown) in the lens 1, the diaphragm 2, the solid-state image sensor 3, and the automatic gain controller (AGC) of the AFE 4.

A video signal processing circuit 11 outputs a processed signal to a recording unit 12, which records an image signal. A monitor 13 displays an image.

An image signal generated by the camera signal processing circuit 7 is output to the video signal processing circuit 11, which performs predetermined video signal processing on the input image signal. The monitor 13 displays an image signal processed by the video signal processing circuit 11.

Figure 2:
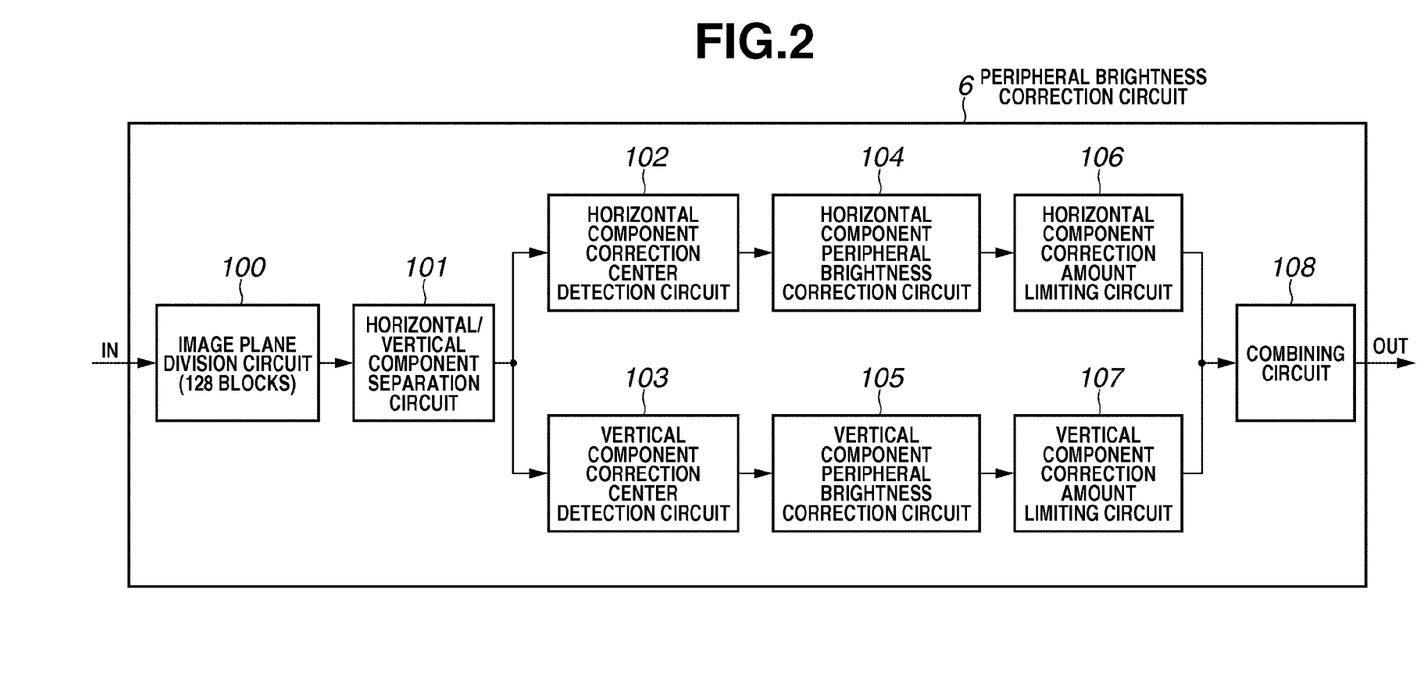
FIG. 2 is a block diagram illustrating a peripheral brightness correction circuit of the imaging apparatus according to an exemplary embodiment of the present invention.

FIG. 2 illustrates an example configuration of the peripheral brightness correction circuit 6, which can perform an operation for correcting light falloff at edges. In FIG. 2, an image plane division circuit 100 divides an output signal from the AFE 4 into 128 uniform blocks.

A horizontal/vertical component separation circuit 101 receives the signal of 128 blocks from the image plane division circuit 100 and separates the input signal into a horizontal component in 16 blocks and a vertical component in 8 blocks.

A horizontal component correction center detection circuit 102 receives a horizontal component signal (i.e., one of the output signals from the horizontal/vertical component separation circuit 101) and detects a horizontal component correction center block from among 16 blocks constituting the horizontal component.

A horizontal component peripheral brightness correction circuit 104 performs an operation for correcting light falloff at edges of the horizontal component signal based on positional information of the horizontal component correction center block, i.e., an output signal from the horizontal component correction center detection circuit 102.

A horizontal component correction amount limiting circuit 106 limits the horizontal component signal subjected to the correction of light falloff at edges (i.e., an output signal from the horizontal component peripheral brightness correction circuit 104) such that a correction amount does not exceed a predetermined reference value.

A vertical component correction center detection circuit 103 receives a vertical component signal (i.e., one of the output signals from the horizontal/vertical component separation circuit 101) and detects a vertical component correction center block from among eight blocks constituting the vertical component.

A vertical component peripheral brightness correction circuit 105 performs an operation for correcting light falloff at edges of the vertical component signal based on positional information of the vertical component correction center block, i.e., an output signal form the vertical component correction center detection circuit 103.

A vertical component correction amount limiting circuit 107 limits the vertical component signal subjected to the correction of light falloff at edges (i.e., an output signal from the vertical component peripheral brightness correction circuit 105) such that a correction amount does not exceed a predetermined reference value.

A combining circuit 108 combines an output signal from the horizontal component correction amount limiting circuit 106 and an output signal from the vertical component correction amount limiting circuit 107. Namely, the combining circuit 108 combines the corrected signals and outputs a combined signal.

Figure 3:
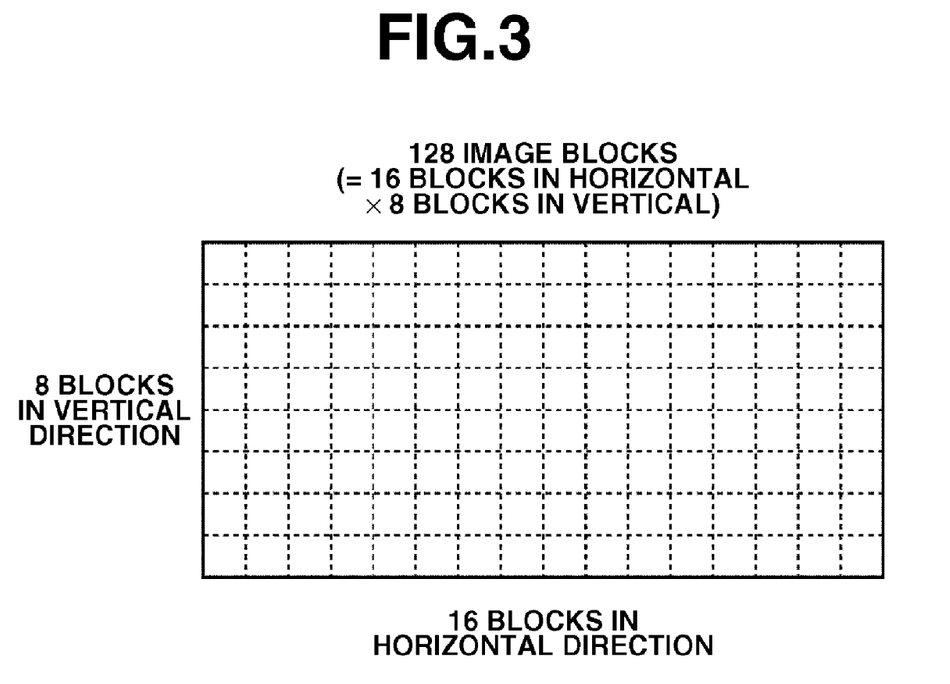
FIG. 3 illustrates an example image plane divided into 128 blocks.
Figure 4:
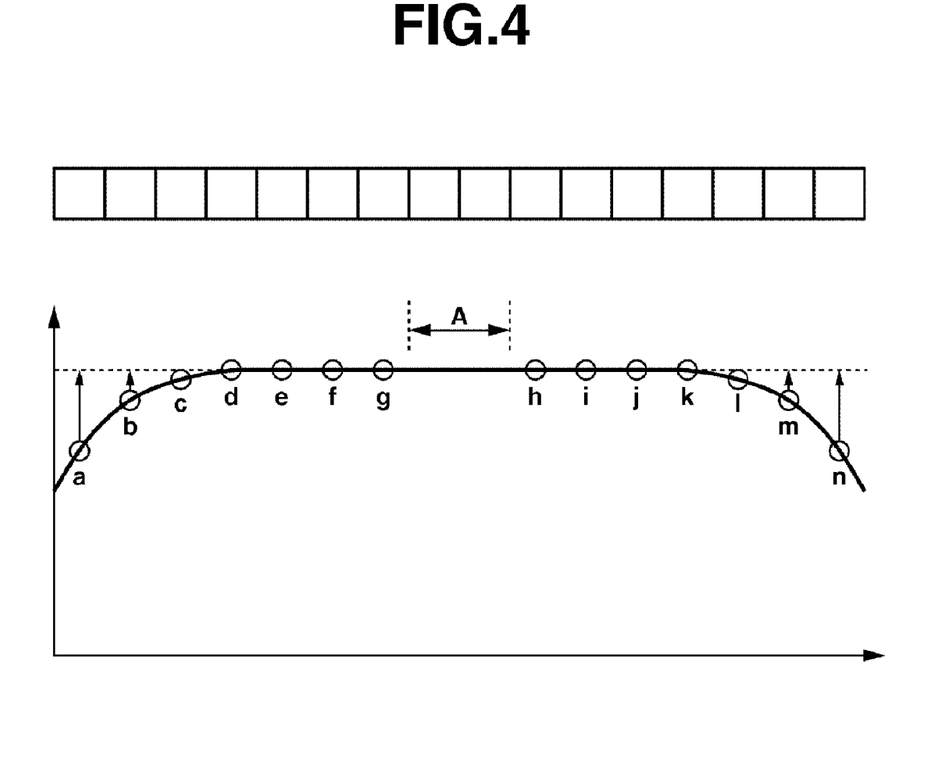
FIG. 4 illustrates an example operation for correcting light falloff at edges of a horizontal component signal.
Figure 5:
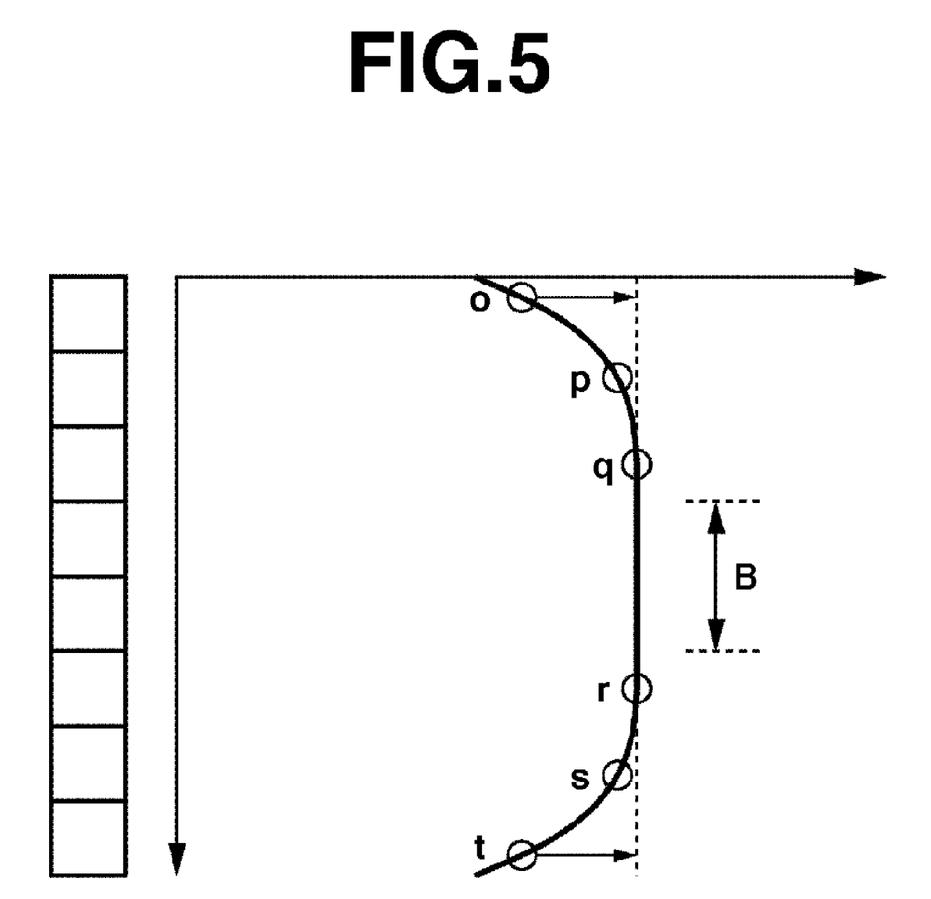
FIG. 5 illustrates an example operation for correcting light falloff at edges of a vertical component signal.

The above-described circuits 100 through 108 constitute the peripheral brightness correction circuit 6. An example operation for correcting light falloff at edges is described in detail with reference to FIGS. 3 through 5. FIG. 3 illustrates an example image plane divided into 128 blocks. FIG. 4 illustrates an example operation for correcting light falloff at edges of a horizontal component signal. FIG. 5 illustrates an example operation for correcting light falloff at edges of a vertical component signal.

The peripheral brightness correction circuit 6 divides an effective image plane into a total of 128 pixels (i.e., 8 pixels in the vertical direction×16 pixels in the horizontal direction) as illustrated in FIG. 3, and calculates an amount of light falloff at edges for each of the horizontal component and the vertical component.

Regarding an operation for correcting light falloff at edges of a horizontal component signal, as illustrated in FIG. 4, the peripheral brightness correction circuit 6 calculates an average luminance value A from two central blocks of the horizontal component composed of 16 blocks.

The peripheral brightness correction circuit 6 compares the average luminance value A with a luminance value of every block and calculates luminance differences between the central luminance and a luminance of every block (a-A, b-A, c-A, d-A, e-A, f-A, g-A, h-A, i-A, j-A, k-A, l-A, m-A, and n-A).

Then, the peripheral brightness correction circuit 6 performs an operation for correcting light falloff at edges of the horizontal component signal using a correction gain value for correcting the calculated luminance differences between the central luminance and a luminance of every block.

The corrected horizontal component signal is output to the horizontal component correction amount limiting circuit 106. For example, it is determined whether the luminance difference a-A is equal to or greater than a predetermined reference value. If the luminance difference a-A is equal to or greater than the predetermined reference value, the operation for correcting light falloff at edges is performed based on the reference value. Such a correction that does not use a larger luminance difference exceeding the reference value can prevent the signal-to-noise (S/N) ratio from deteriorating in the peripheral region of the image plane.

Similar to the above-described operation for correcting light falloff at edges of a horizontal component signal, the peripheral brightness correction circuit 6 calculates an average luminance value B from two central blocks of a vertical component signal composed of eight blocks, as illustrated in FIG. 5.

The peripheral brightness correction circuit 6 compares the average luminance value B with a luminance value of every block and calculates luminance differences between the central luminance and a luminance of every block (o-B, p-B, q-B, r-B, s-B, and t-B).

Then, the peripheral brightness correction circuit 6 performs an operation for correcting light falloff at edges of the vertical component signal using a correction gain value for correcting the calculated luminance difference between the central luminance and a luminance of every block.

The corrected vertical component signal is output to the vertical component correction amount limiting circuit 107. For example, it is determined whether the luminance difference o-B is equal to or greater than a predetermined reference value. If the luminance difference o-B is equal to or greater than the predetermined reference value, the operation for correcting light falloff at edges is performed based on the reference value.

Such a correction that does not use a larger luminance difference exceeding the reference value can prevent the signal-to-noise (S/N) ratio from deteriorating in the peripheral region of the image plane.

Next, an example timing determination operation, which is performed in the operation for correcting light falloff at edges, is described with reference to FIG. 6.

Figure 6:
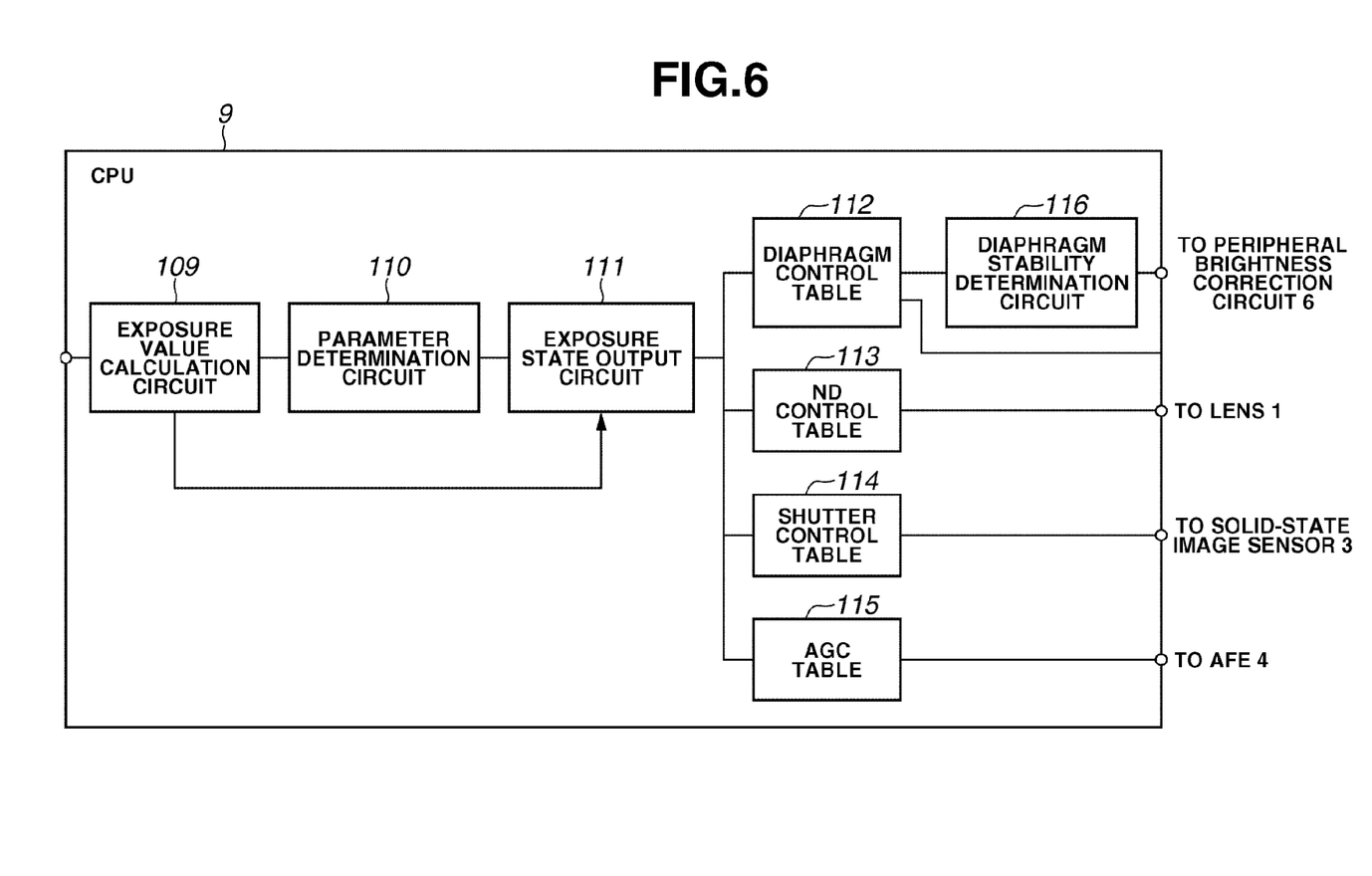
FIG. 6 is a block diagram illustrating an example internal configuration of a central processing unit (CPU), which determines the state of an aperture value, provided in the imaging apparatus according to an exemplary embodiment of the present invention.

FIG. 6 is a block diagram illustrating an internal configuration of the CPU 9, which determines the state of an aperture value. An exposure value calculation circuit 109 calculates an exposure value Ev from the Y signal output from the camera signal processing circuit 7 via the luminance level detection unit 8.

A parameter determination circuit 110 determines whether a control parameter that is currently being used in the imaging apparatus is an aperture value based on a preset exposure control program and the calculated exposure value Ev.

An exposure state output circuit 111 output various control parameters (aperture value, shutter speed value, sensitivity, etc.) for the imaging apparatus based on the preset exposure control program and the calculated exposure value Ev.

If the parameter determination circuit 110 determines that the diaphragm 2 is currently being controlled to perform exposure control, the exposure state output circuit 111 outputs a current diaphragm control parameter to a diaphragm control table 112. The diaphragm control table 112 can receive information indicating whether the aperture value is in a stable state and information indicating a time having elapsed in the stable state after the aperture value became stable, in addition to the current diaphragm control parameter.

Figure 7:
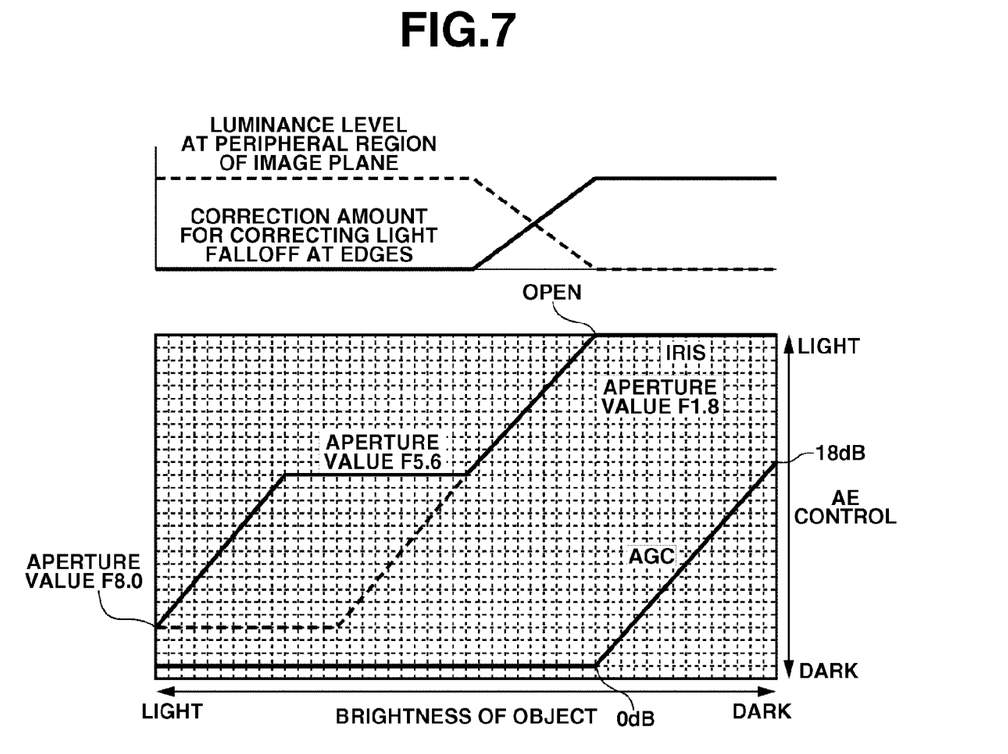
FIG. 7 illustrates an example of a control program for exposure control performed by the imaging apparatus according to an exemplary embodiment of the present invention.

FIG. 7 illustrates an example of a control program for exposure control. To simplify the expression, FIG. 7 illustrates an example relationship between an aperture value and sensitivity. An oblique line represents a control parameter being currently controlled. Namely, if the aperture value is smaller (brighter) than F1.8, the diaphragm 2 is not controlled while the sensitivity (AGC) is increased to control the exposure value Ev.

As apparent from FIG. 7, when the aperture value is relatively large (when the aperture diameter is small), no light falloff at edges appears. However, when the diaphragm 2 is controlled in a region where the aperture value varies from F5.6 to F1.8, a significant amount of light falloff at edges appears.

A diaphragm stability determination circuit 116 compares a predetermined reference value with a stabilization time of the aperture value calculated based on an output signal from the diaphragm control table 112 and determines whether the aperture value is in a stable state.

In an exemplary embodiment, if an amount of change the aperture value is within a predetermined range, it can be determined that the aperture value is in a stable state. The period of time during which the aperture value is in a stable state is referred to as a "stabilization time of the aperture value."

If the diaphragm stability determination circuit 116 determines that the aperture value is in a stable state, the diaphragm stability determination circuit 116 outputs an ON signal to instruct the peripheral brightness correction circuit 6 to perform an operation for correcting light falloff at edges.

If the diaphragm stability determination circuit 116 determines that the aperture value is not in a stable state, namely, if it is determined that the aperture value is varying, the diaphragm stability determination circuit 116 outputs an OFF signal to instruct the peripheral brightness correction circuit 6 to stop correcting light falloff at edges.

If the peripheral brightness correction is performed in a state where the aperture value is not stable (namely, when the aperture value is varying), appropriate correction effects cannot be obtained or the correction cannot be accurately performed. This is the reason why an exemplary embodiment determines whether the aperture value is in a stable state.

Therefore, according to an exemplary embodiment, if the stabilization time of the aperture value is equal to or greater than a predetermined value, it is determined that the aperture value is in a stable state (is not varying).

Similarly, the exposure state output circuit 111 outputs current control parameters to an ND control table 113, a shutter control table 114, and an automatic gain control (AGC) table 115.

The ND control table 113, the shutter control table 114, and the AGC table 115 convert the control parameters into corresponding control values, which are respectively output to the lens 1, the solid-state image sensor 3, and the AFE 4.

Furthermore, if the parameter determination circuit 110 determines that exposure control is currently being performed without controlling the diaphragm 2, the exposure state output circuit 111 outputs a current diaphragm control parameter to the diaphragm control table 112.

Then, the diaphragm stability determination circuit 116 does not perform the determination and directly outputs an ON signal to instruct the peripheral brightness correction circuit 6 to perform an operation for correcting light falloff at edges.

This is because, as the parameter determination circuit 110 determines that exposure control is currently being performed without controlling the diaphragm 2, it can be naturally determined that the aperture value is in a stable state (namely, the aperture value is not varying).

However, a signal can be sent to the peripheral brightness correction circuit 6 after the diaphragm stability determination circuit 116 completes the determination with respect to the stability of the diaphragm 2 (namely, after the stable state is confirmed).

Similarly, the exposure state output circuit 111 outputs current control parameters to the ND control table 113, the shutter control table 114, and the AGC table 115.

The ND control table 113, the shutter control table 114, and the AGC table 115 convert the control parameters into corresponding control values, which are respectively output to the lens 1, the solid-state image sensor 3, and the AFE 4.

Figure 8:
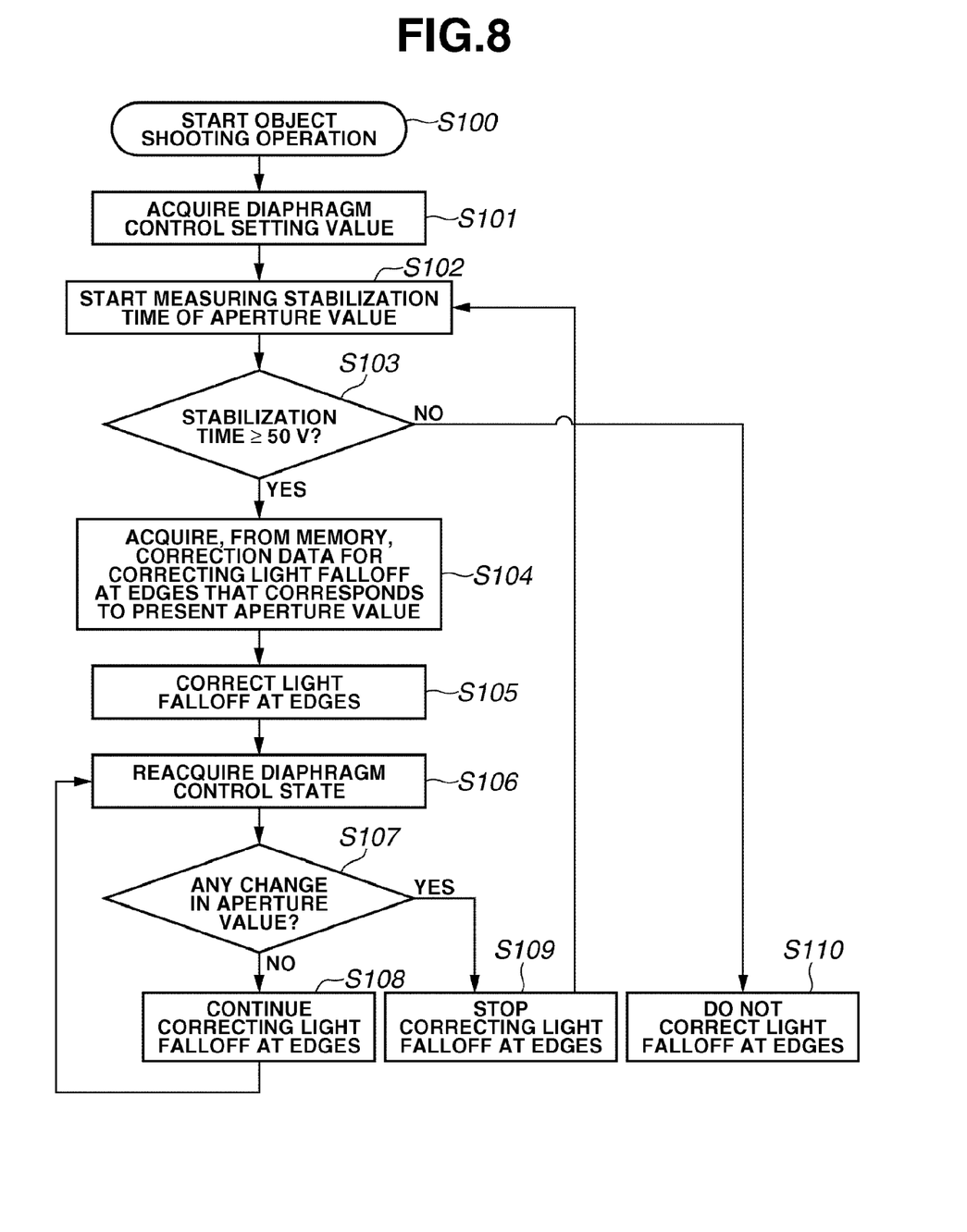
FIG. 8 is a flowchart illustrating an example operation for correcting light falloff at edges performed by the imaging apparatus according to an exemplary embodiment of the present invention.

FIG. 8 is a flowchart illustrating an example operation for correcting light falloff at edges.

In step S100, a user starts a shooting operation for capturing an image of an object. In step S101, the CPU 9 acquires a current aperture value during the object shooting operation. The diaphragm control table 112 is configured to constantly output a real-time aperture value (control value) as long as an optical signal (object image) is input to the solid-state image sensor 3.

In step S102, the CPU 9 starts measuring a stabilization time of the aperture value during the object shooting operation with respect to the current aperture value acquired in step S101. In step S103, the CPU 9 compares the stabilization time of the aperture value measured in step S102 with a predetermined reference value (e.g., 50 V).

If the CPU 9 determines that the stabilization time of the aperture value is less than 50 V (NO in step S103), namely, if the aperture value is not in a stable state, the CPU 9 proceeds to step S110. Then, in step S110, the CPU 9 outputs a control command to instruct the peripheral brightness correction circuit 6 not to correct light falloff at edges.

In an exemplary embodiment, if the operation for correcting light falloff at edges is not performed when the diaphragm 2 is being driven (namely, when the aperture value is not in a stable state), this state can be referred to as a "second state."

If the CPU 9 determines that the stabilization time of the aperture value is equal to or greater than 50 V (YES in step S103), the CPU 9 determines that the aperture value is in a stable state. Then, the processing proceeds to step S104. In step S104, the CPU 9 acquires, from the memory 10, correction data for correcting light falloff at edges that corresponds to the current aperture value.

In step S105, the CPU 9 transfers the correction data (for correcting light falloff at edges) acquired in step S104 to the peripheral brightness correction circuit 6. The peripheral brightness correction circuit 6 corrects light falloff at edges.

In an exemplary embodiment, if the operation for correcting light falloff at edges is performed when the diaphragm 2 is not being driven (namely, when the aperture value is in a stable state), this state can be referred to as a "first state."

In step S106, the CPU 9 reacquires a current aperture value. In step S107, the CPU 9 determines whether there is any change in an aperture value based on a comparison between the aperture value acquired in step S101 and the current aperture value acquired in step S106.

If the CPU 9 determines that an aperture value difference is equal to or greater than a predetermined setting value (YES in step S107), the CPU 9 determines that the aperture value has changed. Then, the processing proceeds to step S109. If the CPU 9 determines that the aperture value difference is less than the predetermined setting value (NO in step S107), the CPU 9 determines that the aperture value has not changed. Then, the processing proceeds to step S108.

In step S109, the peripheral brightness correction circuit 6 stops correcting light falloff at edges. Then, the processing returns to step S102, in which the CPU 9 starts measuring the stabilization time of the aperture value.

In step S108, the peripheral brightness correction circuit 6 continues correcting light falloff at edges. Then, if a predetermined time has elapsed, the processing returns to step S106, in which the CPU 9 repeats the above-described processing.

As described above, according to the first exemplary embodiment of the present invention, it is determined whether the aperture value is in a stable state during an object shooting operation and the ON/OFF switching is performed for selectively executing a correction of light falloff at edges. Accordingly, the first exemplary embodiment can prevent a correction amount for correcting light falloff at edges from becoming excessively large or small and can stabilize the correction of light falloff at edges.

According to the above-described exemplary embodiment, if it is determined that the aperture value is not in a stable state, the operation for correcting light falloff at edges is not performed. However, the present invention is not limited to the above-described embodiment.

For example, according to an exemplary embodiment, when a predetermined time has elapsed after outputting a command instructing the peripheral brightness correction circuit 6 not to correct light falloff at edges, the stabilization time of the aperture value is again measured and, if the aperture value is in a stable state, the operation for correcting light falloff at edges is performed.

According to the above-described exemplary embodiment, if a change in the aperture value is within a predetermined range, it is determined that the aperture value is in a stable state. However, according to an exemplary embodiment, the reference value used in the above-described determination (i.e., the range determining a stable state) can be changed according to a driving direction of the diaphragm 2 (i.e., between a first phase in which the diaphragm 2 changes from the full aperture state to a small aperture state and a second phase in which the diaphragm 2 changes from a small aperture state to the full aperture state).

More specifically, the effect of the correction tends to be excessively large when the diaphragm 2 changes from the full aperture state to a small aperture state. On the other hand, the effect of the correction tends to be small when the diaphragm 2 changes from a small aperture state to the full aperture state. Therefore, a small reference value for determining the stable state can be set if the diaphragm 2 changes from the full aperture state to a small aperture state compared to a reference value used when the diaphragm 2 changes from a small aperture state to the full aperture state. This correction can prevent the image quality from being excessively corrected.

Moreover, in the above-described exemplary embodiment, the correction is not performed in the second state. However, according to an exemplary embodiment, in the second state, a weaker correction than the correction used in the first state can be performed. Even in a state where the aperture value is not in a stable state, performing a weak correction without an excessive correction is effective to improve the quality of an image.

Second Exemplary Embodiment

A second exemplary embodiment of the present invention is described below. An imaging apparatus according to the second exemplary embodiment has a configuration similar to that described in the first exemplary embodiment and, therefore, similar or identical components or parts are not described in the following description.

Figure 9:
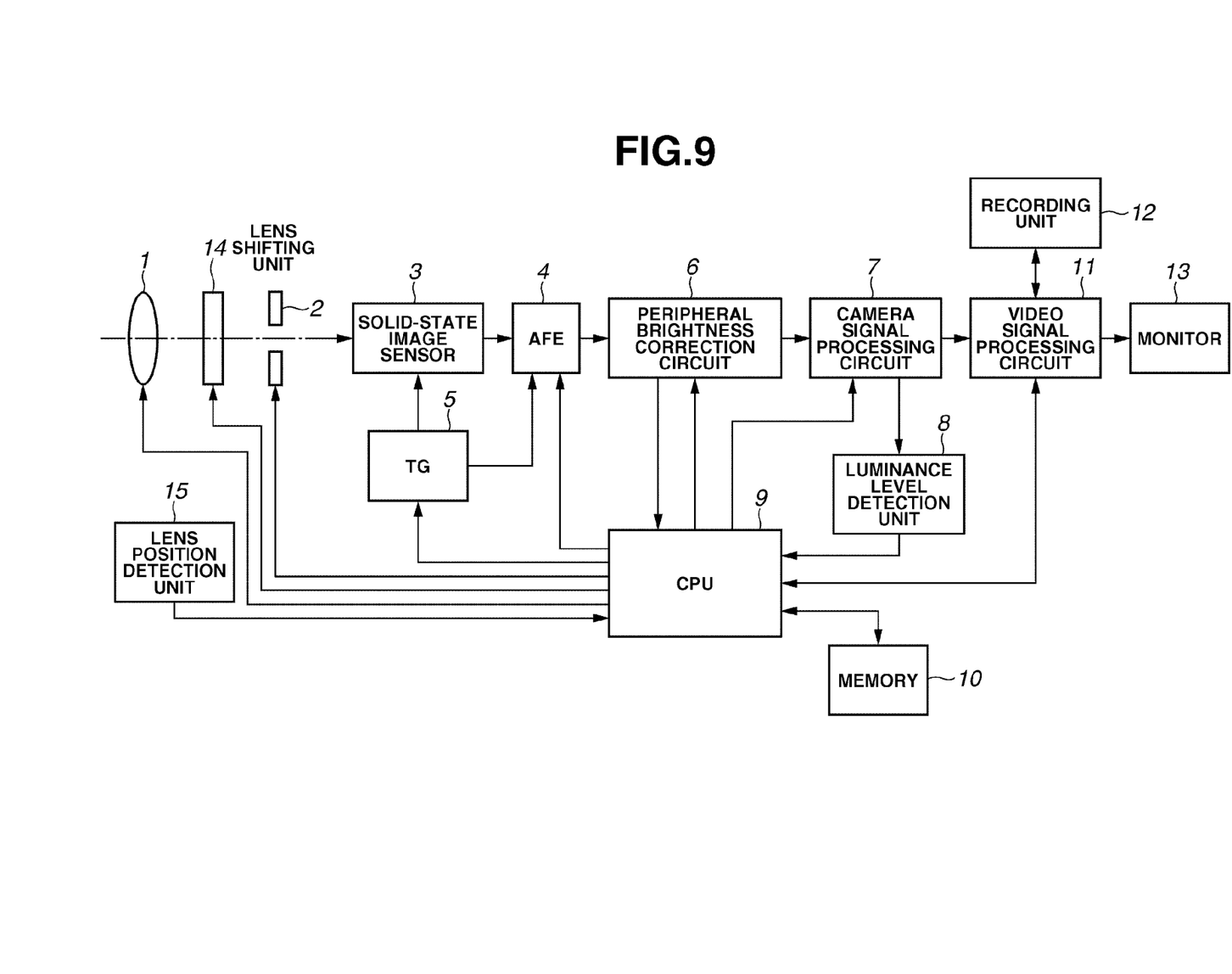
FIG. 9 is a block diagram illustrating an example configuration of an imaging apparatus having an image stabilization function according to a second exemplary embodiment of the present invention.

FIG. 9 is a block diagram illustrating an example configuration of the imaging apparatus according to the second exemplary embodiment.

In the second exemplary embodiment, it is determined whether an image stabilization shift angle (shift amount) is greater than a predetermined reference value. Execution of the correction of light falloff at edges is determined according to the image stabilization shift angle.

If the peripheral brightness correction is performed in a state where the image stabilization shift angle is greater than a reference value (namely, when the position of the optical axis is greatly changed), appropriate correction effects cannot be obtained or the correction cannot be accurately performed. This is the reason why an exemplary embodiment determines whether the image stabilization shift angle is greater than a predetermined reference value.

Therefore, in the present embodiment, the correction is performed if the image stabilization shift angle is equal to or less than a predetermined reference value.

The imaging apparatus illustrated in FIG. 9 has an image stabilization function. The image stabilization function is used to correct any image shake occurring due to a vibration of the imaging apparatus held by a user during a shooting operation.

In FIG. 9, a lens shifting unit 14 is located between the lens 1 and the diaphragm 2. The lens shifting unit 14 can move the lens 1 in a predetermined direction to correct an image shake according to a control signal from the CPU 9.

A lens position detection unit 15 obtains positional information of the lens 1 and sends the positional information of the lens 1 to the CPU 9 to calculate a correction amount for an image shake.

The CPU 9 performs calculations based on the positional information of the lens 1 to obtain an image shake amount and an image stabilization correction angle.

The lens shifting unit 14 performs shifting control for the lens 1 based on the calculated image stabilization correction angle to correct an image shake caused by a vibration of the imaging apparatus. In the present embodiment, the CPU 9, the lens shifting unit 14, and the lens position detection unit 15 cooperatively function as an image stabilization unit.

An electronic image stabilization mechanism is different from the above-described optical image stabilization mechanism in that an effective pixel extraction area for the solid-state image sensor 3 is changed. Therefore, the detection of the image stabilization correction angle during the electronic image stabilization processing can be realized in the following manner. The CPU 9 calculates a vector value of the center of an extracted pixel and calculates a motion vector amount based on vectors of respective pixels. Then, the CPU 9 calculates an image stabilization correction angle.

Figure 10:
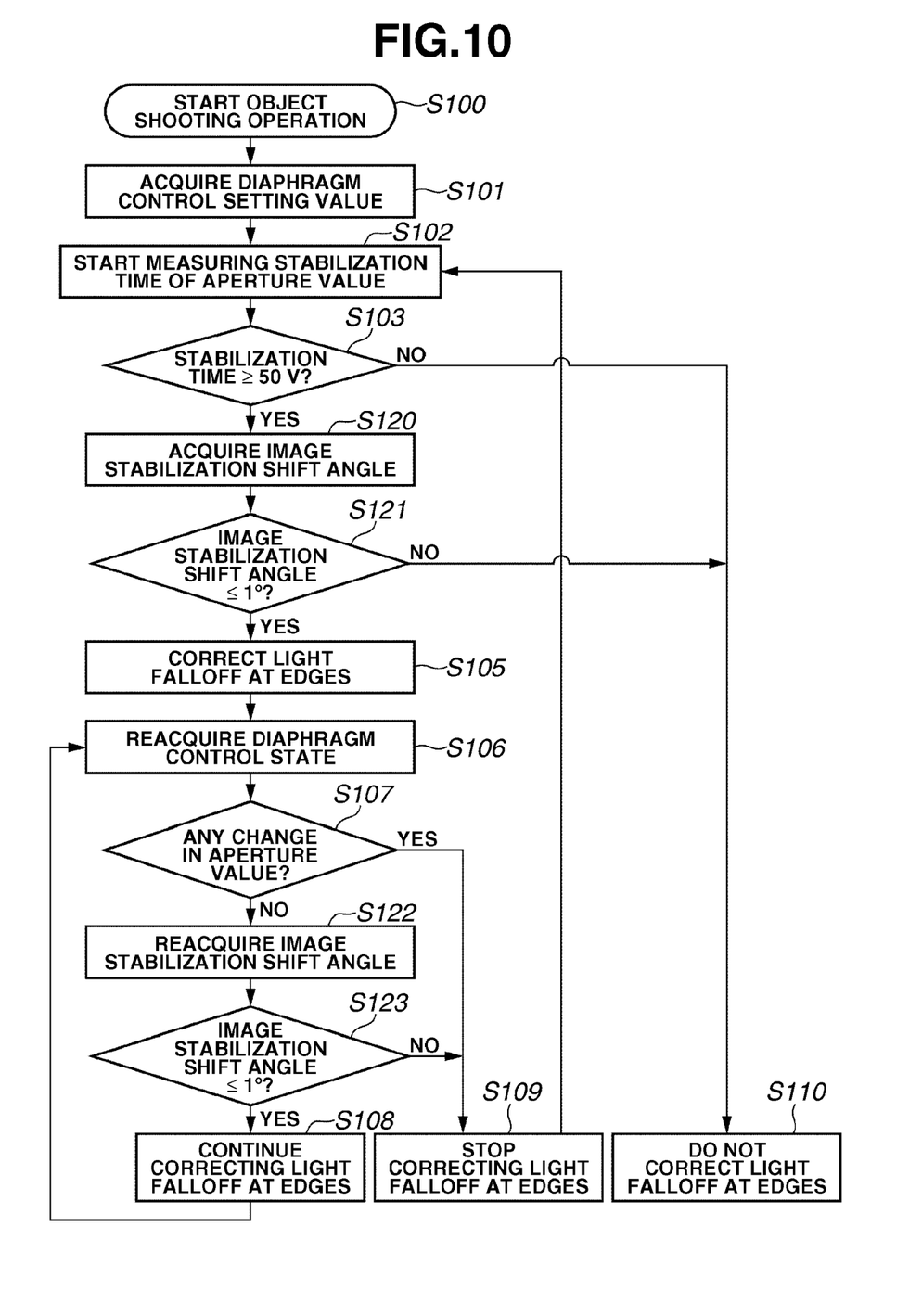
FIG. 10 is a flowchart illustrating an example operation for correcting light falloff at edges performed by the imaging apparatus having an image stabilization function according to an exemplary embodiment of the present invention.

FIG. 10 is a flowchart illustrating an example operation for correcting light falloff at edges performed by the imaging apparatus having the image stabilization function. In the flowchart illustrated in FIG. 10, steps S100 through S102 are similar to those described in the first exemplary embodiment and are, therefore, not described below.

If the CPU 9 determines that the stabilization time of the aperture value is equal to or greater than 50 V (YES in the comparison step S103), the CPU 9 determines that the aperture value is in a stable state. Then, the processing proceeds to step S120.

In step S120, the CPU 9 acquires a current image stabilization shift angle (image stabilization correction angle). Then, in step S121, the CPU 9 compares the current image stabilization shift angle acquired in step S120 with a predetermined reference value (e.g., 1°).

If the CPU 9 determines that the image stabilization shift angle is greater than 1° (NO in step S121), the processing proceeds to step S110. Then, in step S110, the CPU 9 outputs a control command to instruct the peripheral brightness correction circuit 6 not to correct light falloff at edges.

As described above, if the image stabilization shift angle is greater than 1° even when the aperture value is in a stable state, i.e., if the driving of the diaphragm 2 or the image stabilization function has an effect on the correction of light falloff at edges, this state can be referred to as a "second state."

If the CPU 9 determines that the image stabilization shift angle is equal to or less than 1° (YES in step S121), the CPU 9 acquires correction data for correcting light falloff at edges from the memory 10. Then, the processing proceeds to step S105. In step S105, the peripheral brightness correction circuit 6 corrects light falloff at edges.

As described above, if the aperture value is in a stable state and the image stabilization shift angle is equal to or less than 1°, i.e., if the driving of the diaphragm 2 and the image stabilization function does not have any effect on the correction of light falloff at edges, this state can be referred to as a "first state."

In an exemplary embodiment, the correction amount for correcting light falloff at edges is set to a value obtained by shifting the correction amount corresponding to the current aperture value by the image stabilization shift angle in the horizontal direction or in the vertical direction. Next, in step S106, the CPU 9 reacquires a current aperture value.

In step S107, the CPU 9 determines whether there is any change in an aperture value based on a comparison between the aperture value acquired in step S101 and the current aperture value acquired in step S106.

If the CPU 9 determines that an aperture value difference is equal to or greater than a predetermined setting value (YES in step S107), the CPU 9 determines that the aperture value has changed. Then, the processing proceeds to step S109. In step S109, the peripheral brightness correction circuit 6 stops correcting light falloff at edges. Then, the processing returns to step S102, in which the CPU 9 starts measuring the stabilization time of the aperture value.

If the CPU 9 determines that the aperture value difference is less than the setting value (NO in step S107), the CPU 9 determines that the aperture value has not changed. Then, the processing proceeds to step S122. In step S122, the CPU 9 reacquires a current image stabilization shift angle.

Then, in step S123, the CPU 9 compares the current image stabilization shift angle acquired in step S122 with a predetermined reference value (e.g., 1°). If the CPU 9 determines that the image stabilization shift angle is greater than 1° (NO in step S123), the processing proceeds to step S109. Then, in step S109, the peripheral brightness correction circuit 6 stops correcting light falloff at edges. Then, the processing returns to step S102, in which the CPU 9 starts measuring the stabilization time of the aperture value.

If the CPU 9 determines that the image stabilization shift angle is equal to or less than 1° (YES in step S123), the processing proceeds to step S108. In step S108, the peripheral brightness correction circuit 6 continues correcting light falloff at edges. Then, if a predetermined time has elapsed, the processing returns to step S106, in which the CPU 9 repeats the above-described processing.

As described above, according to the second exemplary embodiment of the present invention, the ON/OFF switching is performed for selectively executing the correction of light falloff at edges considering a change in the aperture value as well as a change in the image stabilization shift angle.

Accordingly, even in a case where an imaging apparatus has an image stabilization function, the second exemplary embodiment can prevent the correction amount for correcting light falloff at edges from becoming excessively large or small and can stabilize the correction of light falloff at edges.

According to the above-described exemplary embodiment, it is determined whether the image stabilization shift angle has changed after determining whether the aperture value has changed. However, according to an exemplary embodiment, it can be determined whether the aperture value has changed after determining whether the image stabilization shift angle has changed.

Moreover, according to an exemplary embodiment, the above-described determinations can be performed in parallel. Execution of the correction of light falloff at edges can be determined considering the determination results.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-133888 filed May 21, 2007, which is hereby incorporated by reference herein in its entirety.

What is claimed is:

1. An imaging apparatus comprising:
a diaphragm unit configured to adjust an amount of incident light on an image sensor;
an image stabilization unit configured to correct an image shake caused by a vibration of the imaging apparatus;
a correction unit configured to perform a correction of an image signal that corresponds to at least one of driving of the diaphragm unit and driving of the image stabilization unit; and
a control unit configured to control the diaphragm unit, the image stabilization unit, and the correction unit,
wherein the correction unit includes at least a first state for performing a correction of the image signal when it can be substantially determined that neither the diaphragm unit nor the image stabilization unit is being driven by the control unit and a second state for not performing a correction of the image signal or for performing a correction of the image signal weaker than that performed in the first state when it can be substantially determined that at least one of the diaphragm unit and the image stabilization unit is being driven by the control unit.

2. The imaging apparatus according to 1, wherein, when the correction unit is in the first state, the control unit redetermines whether it can be substantially determined that the diaphragm unit is being driven or redetermines whether it can be substantially determined that the image stabilization unit is being driven and, in at least one of a case where it is substantially determined that the diaphragm unit is being driven and a case where it is substantially determined that the image stabilization unit is being driven, the control unit stops the correction that is being performed by the correction unit.

3. The imaging apparatus according to claim 1, wherein the image stabilization unit is capable of constantly outputting an image stabilization shift angle as long as an optical signal is input to the image sensor.

4. The imaging apparatus according to claim 1, wherein the control unit substantially determines that the diaphragm unit not is being driven if an amount of change of driving of the diaphragm unit is within a predetermined range.

5. The imaging apparatus according to claim 4, wherein the control unit sets an amount of change of an aperture value according to which it is substantially determined that the diaphragm unit is being driven to a smaller value when the diaphragm unit changes from a full aperture state to a small aperture state than when the diaphragm unit changes from the small aperture state to the full aperture state.

6. The imaging apparatus according to claim 1, wherein the control unit substantially determines that the image stabilization unit is being driven if an image stabilization shift angle of the image stabilization unit is greater than a predetermined reference value.

* * * * *